US008517061B2

(12) United States Patent  
Johnson

(10) Patent No.: US 8,517,061 B2  
(45) Date of Patent: *Aug. 27, 2013

(54) PROCESS FOR ASSEMBLING FITMENT ON TO A CONTAINER

(75) Inventor: James Johnson, Delaware, OH (US)

(73) Assignee: Liqui-Box Corporation, Worthington, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/469,590

(22) Filed: May 11, 2012

(65) Prior Publication Data

US 2012/0279986 A1    Nov. 8, 2012

Related U.S. Application Data

(62) Division of application No. 11/895,843, filed on Aug. 28, 2007, now Pat. No. 8,196,621.

(60) Provisional application No. 60/840,847, filed on Aug. 28, 2006.

(51) Int. Cl.
*B65B 3/04* (2006.01)

(52) U.S. Cl.
USPC ............... 141/2; 141/10; 141/372; 141/375; 141/384

(58) Field of Classification Search
USPC .................. 141/2, 10, 18, 372, 375, 383, 384
See application file for complete search history.

(56) References Cited

U.S. PATENT DOCUMENTS

| 4,421,146 | A | * | 12/1983 | Bond et al. .................. 141/349 |
| 4,445,539 | A | * | 5/1984 | Credle ..................... 137/614.03 |
| 4,445,551 | A | * | 5/1984 | Bond et al. .................. 141/349 |
| 5,031,662 | A | * | 7/1991 | Roethel ................... 137/614.03 |
| 5,072,756 | A | * | 12/1991 | Carr ....................... 137/614.04 |
| 5,095,962 | A | * | 3/1992 | Lloyd-Davies et al. ...... 141/346 |
| 5,255,713 | A | * | 10/1993 | Scholle et al. .......... 137/614.04 |
| 5,680,970 | A | * | 10/1997 | Smith et al. .................. 222/514 |
| 5,697,410 | A | * | 12/1997 | Rutter et al. .................. 141/346 |
| 5,901,761 | A | * | 5/1999 | Rutter et al. .................. 141/346 |

(Continued)

FOREIGN PATENT DOCUMENTS

| CA | 2371239 | 12/2000 |
| CA | 2554832 | 8/2005 |
| EP | 0156500 | 10/1985 |
| WO | WO 2004/085283 | 7/2004 |

OTHER PUBLICATIONS

European Search Report EP07800537, mailed Jun. 7, 2011.

(Continued)

*Primary Examiner* — Gregory Huson
*Assistant Examiner* — Nicolas A Arnett
(74) *Attorney, Agent, or Firm* — Potter Anderson Corroon LLP; Rakesh H. Mehta, Esq.

(57) ABSTRACT

A collar for a dispensing connector and a fitment assembly are disclosed. The connector collar engages a valved fitment for a container for holding and dispensing fluid. The fitment includes a spout connected to the container and a sliding internal valve body and an external valve body securely positioned within the spout. The connector collar has a fitment end mateable with the fitment so as to compress the top edge of the external valve body so as to form a seal between the external valve body and the dispensing connector.

3 Claims, 15 Drawing Sheets

(56) References Cited

U.S. PATENT DOCUMENTS

| | | | | |
|---|---|---|---|---|
| 5,983,964 A * | 11/1999 | Zielinksi et al. | | 141/346 |
| 6,347,785 B1 * | 2/2002 | Copp et al. | | 251/149.6 |
| 6,561,386 B1 * | 5/2003 | Martens | | 222/105 |
| 6,637,725 B2 * | 10/2003 | Davis et al. | | 251/149.6 |
| 6,702,337 B2 * | 3/2004 | Rutter et al. | | 285/377 |
| 6,779,556 B2 * | 8/2004 | Roethel | | 137/614.03 |
| 6,953,070 B1 * | 10/2005 | Labinski et al. | | 141/351 |
| 7,882,977 B2 * | 2/2011 | Johnson | | 220/268 |
| 8,196,621 B2 * | 6/2012 | Johnson | | 141/372 |
| 2002/0179875 A1 * | 12/2002 | Davis et al. | | 251/149.6 |
| 2004/0256424 A1 * | 12/2004 | Johnson | | 222/518 |
| 2005/0035322 A1 * | 2/2005 | Davis et al. | | 251/149.1 |

OTHER PUBLICATIONS

Co-Pending U.S. Appl. No. 13/469,551, Specification filed May 11, 2011.

Co-Pending U.S. Appl. No. 13/469,551, Preliminary Amendment file May 11, 2011.

Co-Pending U.S. Appl. No. 13/469,680, Specification filed May 11, 2011.

Co-Pending U.S. Appl. No. 13/469,680, Non Final Rejection mailed Aug. 22, 2012.

Co-Pending U.S. Appl. No. 13/469,680, Notice Of Allowance mailed Feb. 20, 2013.

* cited by examiner

PROCESS FOR ASSEMBLING FITMENT ON TO A CONTAINER

CROSS-REFERENCE TO RELATED APPLICATION

This application is filed under the provisions of 35 U.S.C. §121 and claims priority to U.S. patent application Ser. No. 11/895,843, filed on Aug. 28, 2007, which in turn claims priority to the U.S. Provisional Patent Application No. 60/840,847, filed on Aug. 28, 2006. Both applications are incorporated herein in their entirety.

FIELD OF THE INVENTION

In one aspect, the present invention relates to quick-disconnect couplings for the dispensing of liquids and semi-liquids from a collapsible bag. More particularly, the present invention relates to a collar for use with a dispensing connector and a double slider valve fitment for use in a quick-disconnect coupling.

BACKGROUND OF THE INVENTION

Many systems are used for dispensing beverage syrup from a disposable package consisting of a flexible collapsible bag in a corrugated box commonly referred to as a bag-in-box dispensing package.

Generally these systems include a bag that is provided with a fitment in the form of a spout through which filling and dispensing occurs. It is generally desirable to provide a quick-disconnect coupling between the spout and the service line of the pump or other type of beverage mixing and dispensing system. Such a coupling may be carried on the spout fitment of the bag and will work in conjunction with the service line connector or "probe", and is commonly called in the art a single-service valve and coupling since it is discarded with the bag when it is emptied. This type of valve opens automatically as the line connector is connected to the spout and closes as it is disconnected therefrom to prevent syrup from draining from the bag.

Quick-connect valve systems and slider fitments for fluid dispensing are known. Certain fitments having valves having more than one moveable component are also known.

Some systems are dedicated to only one type of currently known service line connection; while others are adapted to be used with various types of service line connectors.

U.S. Pat. No. 4,445,551 (Bond, et al.) teaches a cylindrical tubular valve member having a closed lower end positioned within a spout. Gripping lugs on the valve member are adapted to grip the dispensing connector. For dispensing, the dispensing connector pushes the valve member inwardly so that outlets on the side thereof are open to fluid flow. A seal is produced between the O-ring on the dispensing connector and the valve body.

U.S. Pat. No. 4,421,146 (Bond and Ulm) teaches a dispensing valve assembly for coupling to a service line connector. The valve member has gripping members that cooperate with the dispensing connector to move the valve between a closed and open position. The dispensing connector also has a collar for gripping the spout. An O-ring on the dispensing connector provides a seal with the valve.

U.S. Pat. No. 6,347,785 (Copp, et al.) discloses a universal quick-disconnect coupling and valve. The fitment includes a generally cylindrical spout for attachment to a container that is capable of mating with a dispensing connector. A slider moves axially within the spout and has a valve within it that moves from a closed position to an open position upon insertion of a dispensing connector into the slider. An external support member and clamp about the dispensing connector has teeth to engage the flange of an external adapter ring of the spout. The dispensing connector is sealed within the slider by an O-ring which cooperates with an internal adapter sleeve that fits within the slider.

U.S. Pat. No. 5,031,662 (Roethel #1), U.S. Pat. No. 6,779,556 (Roethel #2) and U.S. Pat. No. 6,953,070 (Labinski, et al.) teach a dispensing fitment having a first body secured to a liquid container and forming a first flow passage and a valve assembly connected to this secured body, which has a seal retaining body defining a second flow passage that communicates with an inlet of the first flow passage. A resilient seal member located in the second flow passage is resiliently urged into sealing engagement with the inlet to block fluid flow from the second flow passage into the first flow passage. The assembly further includes a spout that is slideable within the first body to an inward position where the seal member is moved resiliently away from the inlet to allow fluid flow between the passages. The seal retaining body is a resilient tubular member transverse to the first flow passage and is made of a resilient (i.e. rubber) material. A dispensing connector collar has grooves for engaging flanges on the first body. The dispensing connector includes O-rings for sealingly engaging the valve assembly.

U.S. Pat. No. 5,983,964 (Zielinksi, et al.) teaches a dispensing apparatus for coupling between a dispensing connector and the spout of a container so as to permit coupling of a valve sub-assembly housed in the dispensing connector with a single slider valve assembly housed in the spout. The apparatus includes a collar about the dispensing connector and includes sleeves having at least two resilient fingers members. Each finger member has a surface engageable with a flange portion on the outer surface of the spout. A collar is releasably slid over an outer surface of the sleeve for constricting the resilient finger members toward a lower end of the sleeve. The fingers act to lock the collar relative to the spout. The system provides a single-handed coupling operation for the collar and spout. An O-ring on the probe forms the seal with the valve assembly and an inner O-ring connects with the valve sub-assembly. The collar does not engage the valve assembly housed in the spout.

U.S. Pat. No. 5,095,962 (Lloyd-Davies, et al.) teaches a fluid dispensing device comprising a valve member slideable in the spout of a container. The single valve member is tubular and has an open outer end for receiving a dispensing connector and a closed inner end. The valve member has openings through its sidewalls. In the closed position of the valve member, opposed shoulders of the valve member and of the spout resist axial movement of the valve member in either direction and interengaged sealing surfaces block fluid flow to the openings. The outer end portion of the valve member is laterally outwardly deflectable and includes protrusions adapted to enter the recess of a dispensing connector and engage the dispensing connector whereby the valve member can be moved between the open and closed position. In the dispense position, an O-ring provides a seal between the outside of the dispensing connector and the inner wall of the valve member.

U.S. Pat. No. 5,697,410 (Rutter et al. #1) and U.S. Pat. No. 5,901,761 (Rutter, et al. #2) teach a spout fitment for a liquid container. The fitment includes a dispensing valve member slideable within the spout of the container. A valve element within the slideable dispensing valve member is resiliently biased to close a fluid flow opening therein. The valve element sits on the inside of a wall extending across the slideable dispensing valve member and a resilient member is required to push the valve element against the inner surface of this wall. Given this arrangement, a snap fit of parts is not possible. In the dispensing position, an O-ring on the dispensing connector forms a seal with the slideable dispensing valve member. The member may also include a ridge for engaging the O-ring and snapping into an associated groove on the dispensing connector. In some embodiments, a ridge on a dispensing connector shown can apparently press down on the top edge of the slideable dispensing valve member.

U.S. Pat. No. 5,680,970 (Smith and Tschanen) teach a self-closing dispensing valve comprising a valve housing having a fluid conduit with a valve orifice therethrough and a flow control member within the valve body. The flow control member is displaceable between a closed and open position. A plurality of resilient flexible fingers are fixed to either the valve housing or the valve member and are deflected when the valve member is displaced to its open position. The fingers are deflected by a conical camming surface on the valve member when displaced toward the open position.

International Patent Application Publication No. WO 2004/085283 (Johnson) teaches a double slider valve fitment for attachment to a container for fluid. The fitment includes a spout having an external surface capable of mating with a collar of a dispensing connector. An external slider is movable axially within the spout and an internal slider is movable axially within the external slider. The internal slider is movable between a closed position that prevents the flow of fluid through the fitment and an open position that allows for the flow of fluid through the fitment. The internal slider is adapted to be moved between the closed and open positions by insertion of the dispensing connector into the external slider. The internal slider is biased toward the closed position when the dispensing connector is released as a result of temporary deformation of portions of the external slider by the internal slider pressed inwardly by the dispensing connector. The internal slider cooperates with the dispensing connector by means of locking lugs on a top edge thereof. A dispensing connector collar is disclosed, which may be threaded for threaded engagement with an external surface of the spout. In the dispensing position, O-rings on the dispensing connector sealingly engage with the external and internal slider.

Johnson represent a significant improvement in the art. In particular, due to the arrangement of parts, a component that has a significant inherent resilience (i.e. rubber or a spring) is not required; rather the entire fitment is preferably formed of plastic. Further, the relatively simple arrangement of parts facilitates both manufacture of the individual valve components and the assembly of the fitment. There nevertheless remains room in the art for improvement. For example, in the dispensing position, sealing engagement between the dispensing connector and fitment is provided by the O-ring on the dispensing connector.

Known fitments generally seal as a result of rubber O-rings positioned on the probe. This arrangement of parts, even where another sealing position is used, can suffer from leakage and failure.

Where a collar is used, the fitments of the prior art generally engage with a dispensing connector via a gripping collar on the outside of the spout. Typically, the dispensing connector could comprise a collar adapted for threadable engagement with a flanged or threaded outside surface of the spout. The collar is typically adapted to work with certain spouts.

Known fitments further have a tendency for the collar and probe to become inadvertently disengaged, which is very inconvenient to the user.

SUMMARY OF THE INVENTION

Accordingly, in one of its aspects, the present invention provides a fitment assembly comprising: a fitment for attachment to a container for holding and dispensing a fluid and having a generally cylindrical spout attached thereto, the fitment comprising a generally cylindrical external valve body movable to a fixed position within the spout; and a generally cylindrical internal valve body movable axially within the external valve body, the internal valve body movable between a closed position operable to prevent the flow of fluid through the fitment and an open position operable to allow the flow of fluid through the fitment, the internal valve body movable between closed and open positions by insertion of a dispensing connector into the external valve body adjacent the internal valve body, the internal valve body being biased toward the closed position; and a collar for attachment to the dispensing connector and for releasable coupling to the fitment, wherein when coupled to the fitment the collar compressively engages the external valve body to form a seal between the external valve body and the dispensing connector.

In another of its aspects, the present invention provides a dispensing connector collar for engaging a fitment for attachment to a container for holding and dispensing a fluid, the fitment comprising: a spout; an external valve body axially movable to a fixed position within the spout; and an internal valve body movable axially within the external valve body, the internal valve body movable between a closed position operable to prevent the flow of fluid through the fitment and an open position operable to allow the flow of fluid through the fitment, the internal valve body movable between a closed and an open position by insertion of a dispensing connector into the external valve body adjacent the internal slider, the internal valve body being biased toward the closed position; the collar comprising a collar body for engagement about the dispensing connector, the collar body having a fitment end mateable with the fitment so as to compress the top of the external valve body against the dispensing connector to form a seal.

In yet another of its aspects, the present invention provides a connector collar for engaging a valved fitment for a container for holding and dispensing fluid having a spout connected to the container and a valve having at least one slidable component securely positioned within the spout, the connector collar comprising a generally cylindrical collar body for engagement about a dispensing connector, the collar body having a fitment end mateable with the fitment so as to compress the top edge of the at least one slidable component so as to form a seal between the at least one slidable component and the dispensing connector.

In yet another of its aspects, the present invention provides a collar for a dispensing connector for engaging a fitment comprising a slideable valve assembly in a threaded spout, the collar comprising: an internally threaded surface for threadably engaging with the spout and a compression flange for compressing the valve assembly against the dispensing connector to form a seal when the internally threaded surface is threadably engaged with the spout.

DESCRIPTION OF THE DRAWINGS

Embodiments of the present invention will be described with reference to the accompanying drawings, wherein like reference numerals denote like parts, and in which.

DETAILED DESCRIPTION OF THE INVENTION

In a liquid dispensing apparatus such as is used to dispense individual servings of beverages and the like, the syrups, flavorings and other ingredients are frequently supplied in collapsible containers enclosed and shipped within an outer container ("bag-in-box"). The shipping package or container is provided with a fitment that accepts a probe that is part of the dispensing apparatus in order to connect the supply of liquid to the dispensing apparatus. The fitment generally contains a valve that is actuated by the insertion of the probe of the dispensing apparatus in order to allow the liquid to flow into the dispensing apparatus. The fitment attached to the liquid container is generally termed a package connector and the probe or similar device on the dispensing apparatus that interacts with the package connector is generally termed a dispensing connector.

Figure 1:
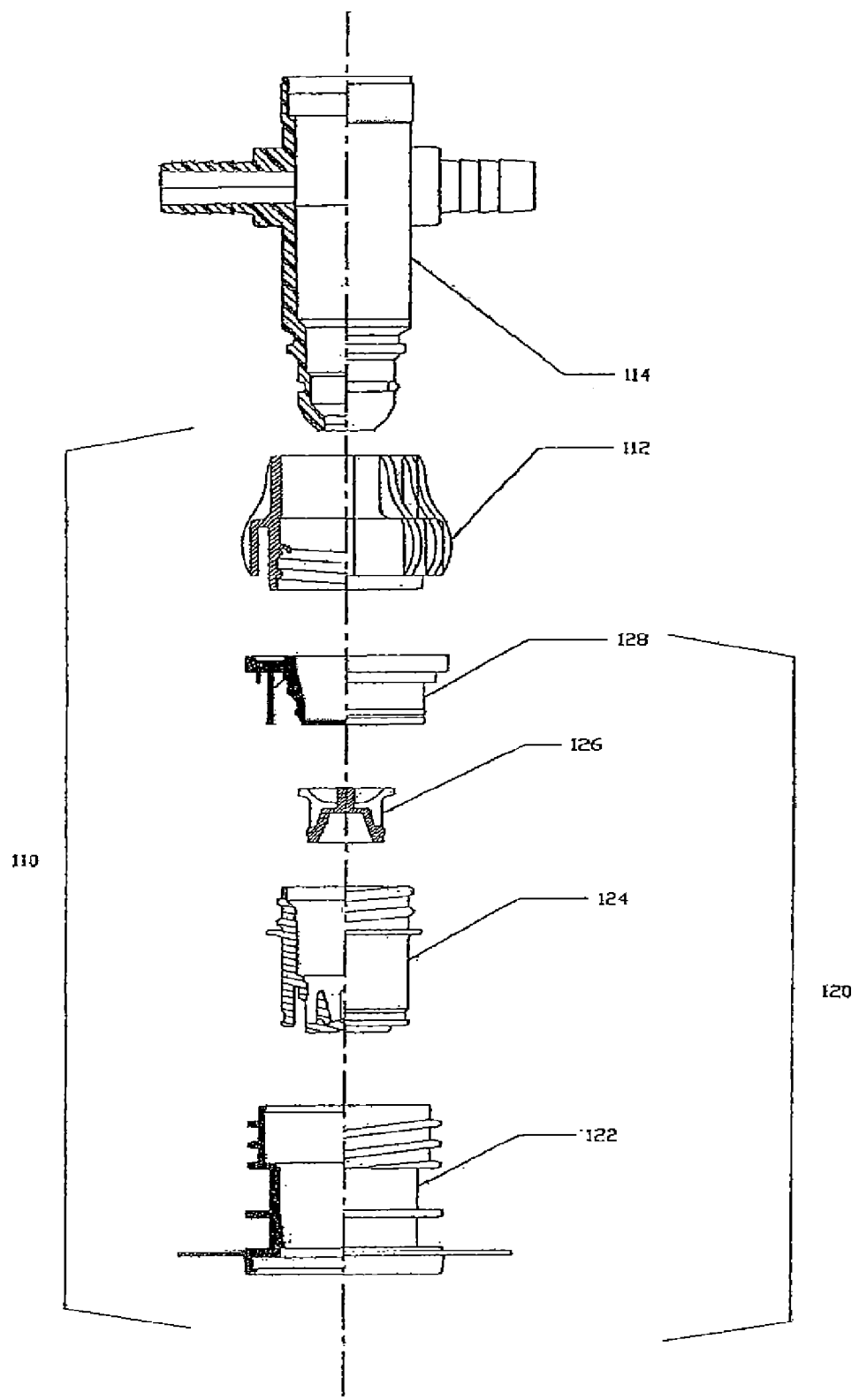
FIG. 1 illustrates an exploded partial cross-sectional side view of a first embodiment of the fitment assembly of the present invention with a dispensing connector.

With reference to FIG. 1, the present invention includes a fitment assembly 110 that includes a collar 112 engageable with a dispensing connector 114 and a double slider valve fitment 120 for attachment to a container (not shown) for holding a liquid (not shown). As will be discussed further below, the present invention also includes the collar 112 of the invention for use with other threaded valve bodies securely slidable within container spouts. However, the collar 112 of the present invention will be discussed in the context of fitment assembly 110, which comprises another embodiment of the present invention.

The fitment 120 comprises a generally cylindrical spout 122 with a generally cylindrical external valve body 124 movable axially within the spout 122 and an internal valve body 126 movable axially within the external valve body 124. As will be described in further detail below, generally external valve body 124 is slideable to a secured position, while internal valve body 126 is repeatedly slideable to enable opening and closing of the valve. The internal valve body 126 is movable between a closed position that prevents fluid from flowing through the fitment 120 and an open position that allows fluid to flow from the container through the fitment 120. The internal valve body 126 is adapted to be moved between the closed and open positions by insertion of the dispensing connector 114 into the external valve body 124. The internal valve body 126 is sized to be received within the external valve body 124. The fitment 120 suitably further includes a cap 128.

The components of the fitment assembly 110 will now be described in more detail with reference to FIGS. 2 through 6. The spout 122 is generally cylindrical in shape and one end is received by the collar 112 of the dispensing connector 114 when the assembly is in a dispense position, as will be discussed further below. At the other end of the spout 122 there is a base portion 130 for attaching the spout 122 to a wall of a container (not shown). Methods and means for attaching the spout 122 to a wall of a container are well known in the art and a variety of attachment mechanisms may be used to secure the spout 122 to a container wall, such as by heat sealing or adhesive attachment or both.

Located at the opposing end of the spout 122 from the base portion 130 is the spout opening 132 (see FIG. 3) which is adapted to receive the dispensing connector 114 therein. The internal surface of the spout 122 suitably includes an integrally melded stop ridge 133 and sealing rings 135, both of which serve to limit the motion of the external valve body 124 at certain stages in the functioning of the fitment assembly 110. Suitable stop ridge 133 and sealing rings 135 are further described in U.S. Pat. No. 6,347,785 (Copp et al.) the disclosures of which are incorporated herein by reference.

The external surface 137 of the spout 122 preferably includes a series of external threads or flanges, which are adapted to mate with corresponding threads on a dispensing apparatus (not shown) or collar 112 with which a double slider fitment 110 may be used. The configuration of the external surface 137 of the spout 122 is not particularly restricted and may be altered in accordance with known ways to connect such surfaces e.g. a snap-fit arrangement could also be used. In the embodiment shown in FIGS. 2 through 6, generally, the configuration of the external surface of the spout is not particularly restricted. In the embodiment shown in FIGS. 9 through 14, the external surface of the spout is threaded for threaded engagement with a cooperating threaded collar.

The external valve body will be described with reference to FIGS. 2 through 6 and FIGS. 7A, 7B and 7C. The external valve body 124 is generally cylindrically shaped having an external shell 138 that includes a stop ridge 140 at one end and a positioning ring 142 at the opposing end. When the external valve body 124 is positioned within the spout 122, the positioning ring 142 is located adjacent the base portion 130 of the spout 122, and the stop ridge 140 is located adjacent the spout opening 132. Suitably, above stop ridge 140, the external surface 138 may be engageable with collar 112, as will be described further below. In the embodiment shown in FIGS. 2 through 6, threaded portion 144 is threadably engageable with the collar 112.

Within the external valve body 124, adjacent the end with the positioning ring 142 is an interior projection 146 that extends around the internal circumference of the shell 138. The projection 146 has an upper surface 148 that faces the end of the shell 138 containing the stop ridge 140, and a lower edge 150 that faces the end of the shell 138 containing the positioning ring 142. Suitably, projection or ledge 146 has an inverted "L" shape as shown in the Figures. Extending away from the lower edge 150 towards the end of the shell 138, which includes the stop ridge 140, are a series of radially spaced posts 152 defining apertures 153 therebetween. The posts 152 support a valve seat 154 at their lower ends. The posts 152 extend substantially parallel to the shell 138 of the external valve body 124 and are spaced from the shell 138 such that liquid may flow between the shell 138 and the posts 152 and through the space between each post 152. The valve seat 154 is substantially circular and extends between the lower ends of the spaced posts 152.

The valve seat 154 includes a plurality of spaced projections 158 that extend upwardly from the valve seat 154 towards the projection 146. The projections 158 are preferably centrally located on the valve seat 154 and are radially spaced thereon and are operable to be received in the internal valve body 126 as will be described below. It will be understood by a person skilled in the art that the projections 158 may be spaced in any pattern and may form any shape that performs the same function as the projections 158.

Figure 8B:
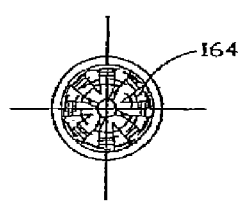
FIG. 8B illustrates a front elevational view of an internal valve body of FIG. 8A.
Figure 8A:
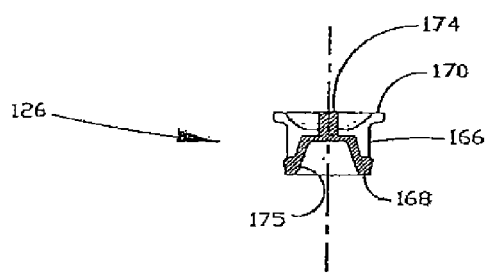
FIG. 8A illustrates a cross-sectional side elevational view of an internal valve body used in the fitment assembly of the present invention.
Figure 8C:
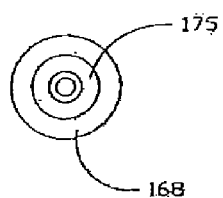
FIG. 8C illustrates a rear elevational view of the internal valve body of FIG. 8B.

The internal valve body 126 will be described with reference to both FIGS. 2 through 6 and especially FIGS. 8A, 8B and 8C. Located on the internal valve body 126 are a series of ports 164 that allow the passage of fluid therethrough when the internal valve body 126 is in the open position. When in the open position, the ports 164 are in fluid communication with the apertures 153 between the posts 152 of the external valve body 124.

Suitably, the internal valve body 126 includes a generally cylindrical body 166 with a base ring 168 that extends around one end of the body 166, and a top ring 170 that extends outwardly from and around the opposing end of the body 166 from the base ring 168. A central post 174 extends away from the body 166 at the opposing end to the base ring 168, and is operable to engage the dispensing connector 114, when the fitment 120 is attached to the dispensing connector 114.

The body 166 is sized to be received within the external valve body 124 extending beyond the projection 146 of the external valve body 124 and operable to abut the valve seat 154. The top ring 170 suitably is sized to extend beyond the circumference of the body 166 to rest against and abut the projection 146 when the internal valve body 126 is in the open position. In the open position, the insertion of the dispensing connector 114 moves the internal valve body 126 towards the valve seat 154 and positions the base ring 168 of the body 166 adjacent the valve seat 154. The projections 158 on the valve seat 154 are biased inwardly by the internal walls 175 of the body 166 of the internal valve body 126.

In one embodiment, the internal walls 175 of the body 166 are sloped inwardly to bias the projections 158 inwardly when the plug 126 is located adjacent the valve seat 154. When the dispensing connector 114 is removed, the projections 158 will return to their normally biased position and flex outwardly. When the projections 158 move outwardly, the internal valve body 126 will be forced away from the valve seat 154 and the internal valve body 126 will return to the closed position. Other embodiments may be used that force the projections to bend away from their normal position upon insertion of the dispensing connector 114 into the fitment, provided that when the dispensing connector 114 is removed the projections force the internal valve body 126 away from the valve seat 154 to the closed position. While the projections 158 are biased inwardly and then flex to their initial position, the required inherent resilience is fairly limited and all parts of the fitment 120 may be formed of a fairly rigid material.

Although the fitment assembly 110 of the present invention may be made of any material having suitable properties, preferably, it is made of a synthetic resin material that can be melded to form its parts. The synthetic resin material must have sufficient resiliency so that the projections 158 will return to their rest position when a deforming pressure is released. If the fitment assembly 110 is made from a single synthetic resin material, recycling of the valve is made particularly easy, because the used valve can be ground up, remelted and remoulded into new valves. It is preferred that the fitment assembly 110 be made from a synthetic resin that is the same as that used to form the liquid-containing bag with which the fitment is used. Such compatibility further increases the ease of recycling the valve. A preferred synthetic resin for the valve is polypropylene. The valve can also be made of high-density polyethylene, polystyrene, nylon or the like.

When the internal valve body 126 returns to the closed position, it may return to either its initial position or to one in which the top ring 170 is lower than in the initial position, i.e. closer to the ledge 146, provided that there is a seal between the internal valve body 126 and the external valve body 124, and no fluid can pass through the fitment 120. The closed position referred to includes all such positions in which the internal valve body 126 is moved away from the valve seat 154 and where no fluid can pass through the fitment 120.

It will be understood by a person skilled in the art in light of the above description that the external valve body 124 is operable to move along the inside of the spout 122 in a smooth telescoping movement while maintaining continuous contact with the spout 122. Likewise, the internal valve body 126 is operable to move along the inside of the external valve body 124 in a smooth telescoping movement. Further, the internal valve body 126 acts like a plug within the external valve body 124 and is seated within the external valve body 124 in the open position to allow fluid to pass through and is unseated in the closed position to prevent fluid from passing through.

Figure 4:
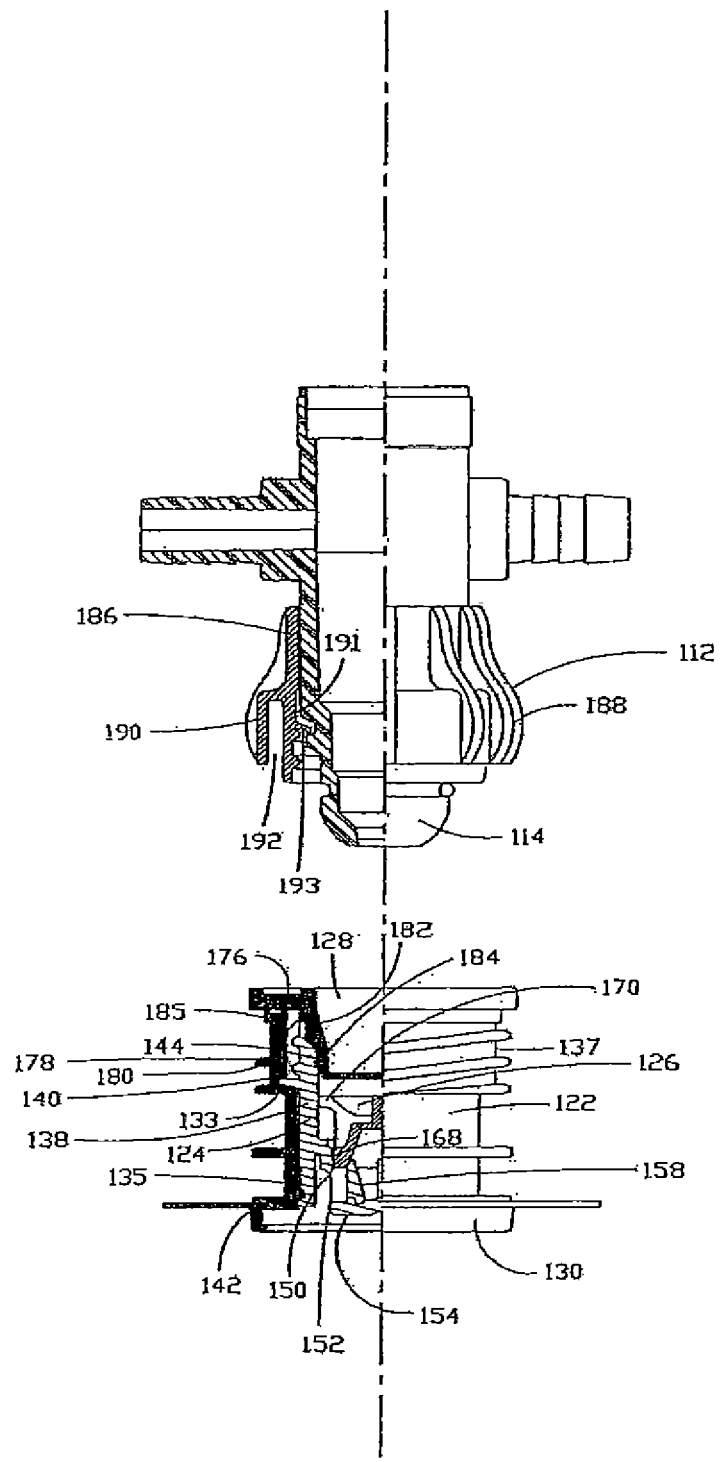
FIG. 4 illustrates a partial cross-sectional side view of a first embodiment of a fitment assembly of the present invention and a dispensing connector in a full-cap position.
Figure 5:
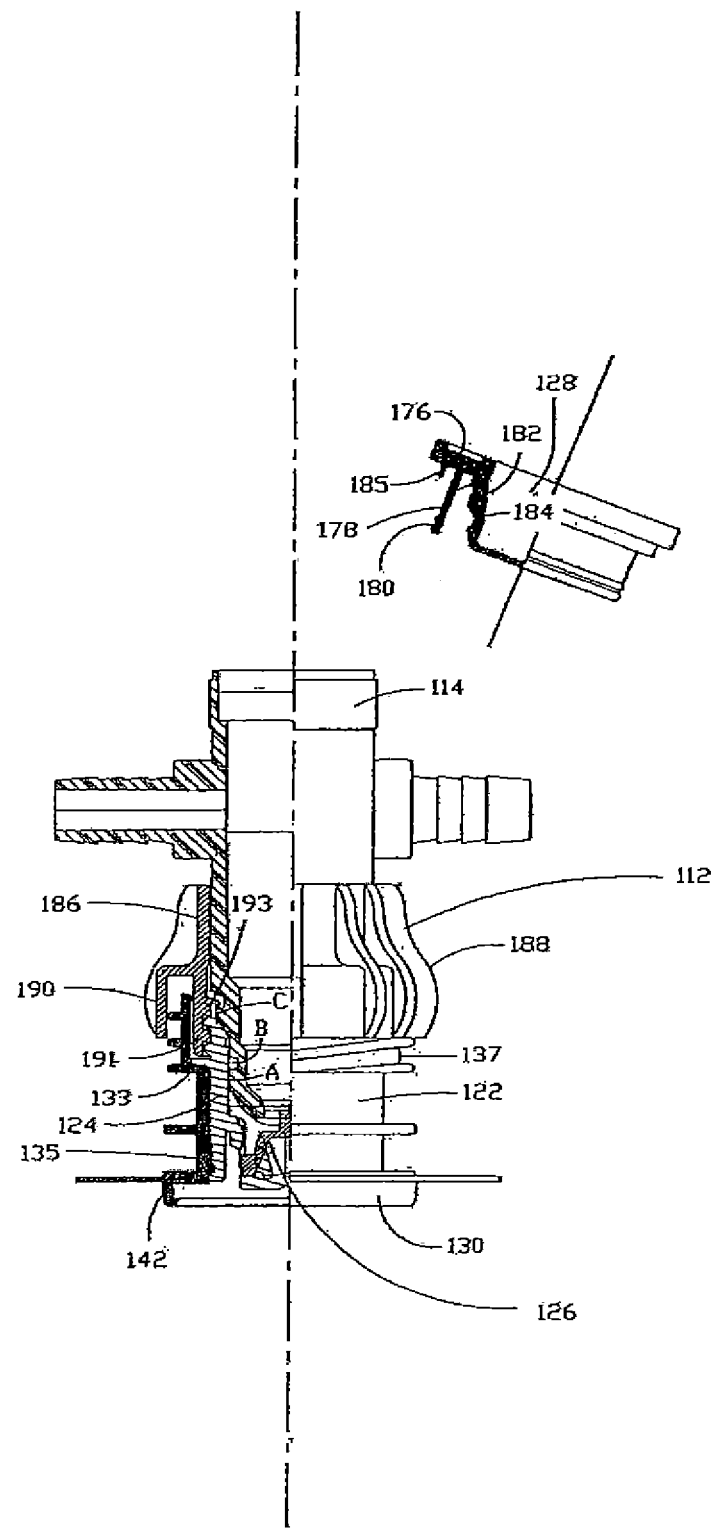
FIG. 5 illustrates a partial cross-sectional side view of a first embodiment of a fitment assembly of the present invention and a dispensing connector in a dispense position.

The fitment assembly 110 preferably further includes a cap 128, suitable components of which are shown in more detail in FIGS. 4 and 5. The cap 128 may include a cover 176 and a skirt 178 bearing an outer retaining ring 180 and an internal cylinder 182 bearing an inner retaining ring 184 which engages the cap 128 with the external valve body 124 when the cap 128, external valve body 124, and internal valve body 126 are removed as a unit in order to fill the container. Suitably, the cap 128 may be sized so that if present the skirt 178 can be received within the spout 122. The cap 128 may also include a smaller outer skirt 185 sized to sit about the top periphery of spout 122, when the fitment is capped. While the configuration of the cap 128 is not particularly restricted and is within the purview of a person skilled in the art, an example of a suitable cap 128 is disclosed in U.S. Pat. No. 6,347,785. Other alternative cap configurations will be apparent to persons skilled in the art.

The inventor of the present invention has surprisingly discovered that a collar 112 that engages the external valve body 124 in a compressive fashion can provide improved sealing and reduced seal failure and otherwise improve the sliding operation of the valve components.

With reference to FIGS. 1 through 6, the collar 112 of the fitment assembly 110 of the present invention comprises a generally cylindrical collar body 186 for engagement about the dispensing connector 114. The collar body 186 includes a fitment end 188 for engaging the fitment. The fitment end 188 includes an external descending flange 190 and an internal descending flange 191 connected to the collar body 186. The external descending flange 190 and internal descending flange 191 are concentrically arranged and form therebetween a receiving space 192.

As will be described further below, the collar 112 engages with the external valve body 124 in a compressive manner, which operates to improve sealing and operation of the double slider mechanism.

The positions of the fitment assembly 110 will now be described in more detail with reference to FIGS. 2 through 6.

Figure 2:
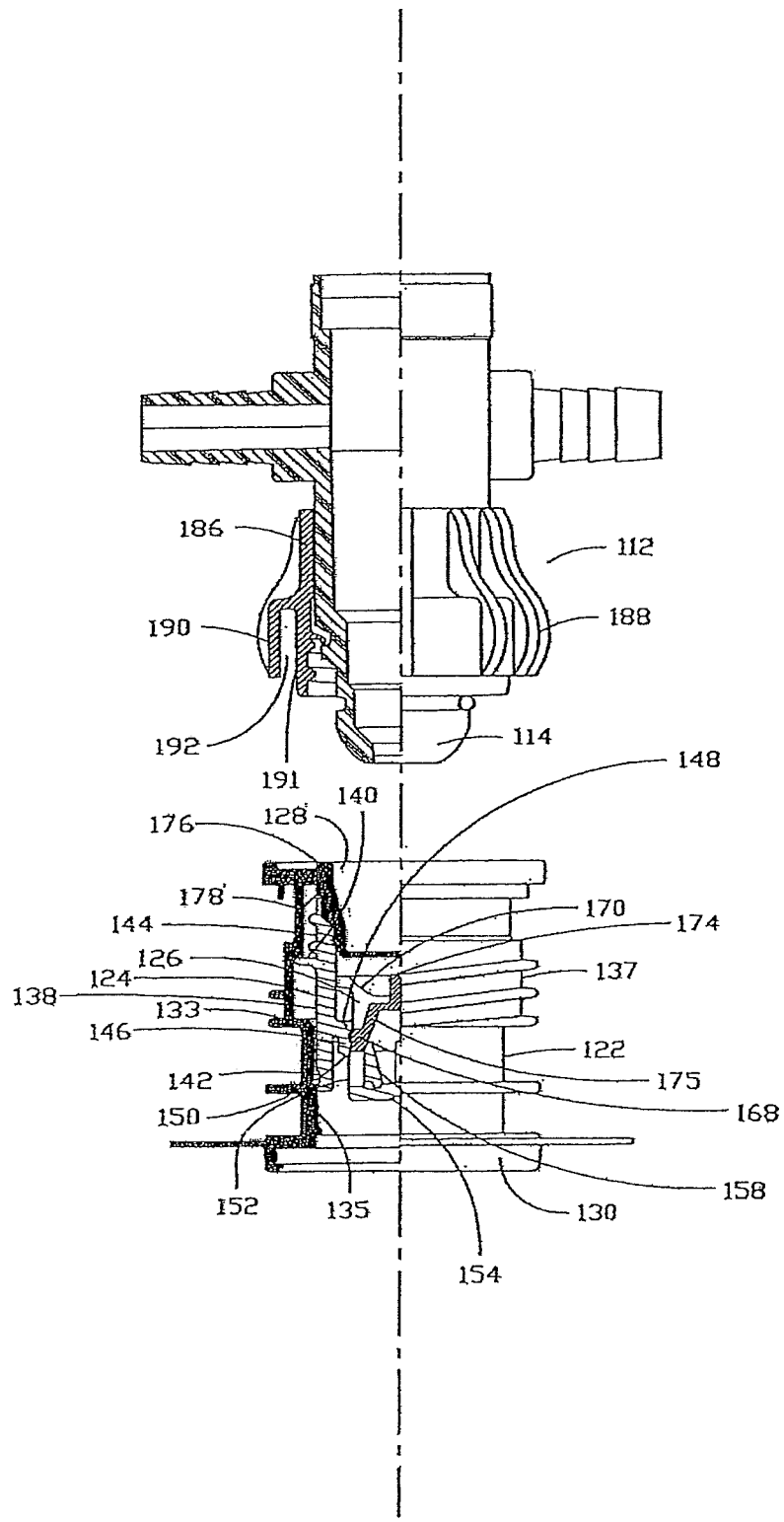
FIG. 2 illustrates a partial cross-sectional side view of a first embodiment of the fitment assembly of the present invention and a dispensing connector in a pre-cap position.

FIG. 2 illustrates a partial cross-sectional side view of the double slider valve fitment 120 in a pre-cap position. In this position, the fitment 120 is removably positioned within the spout 122, in order to be readily removable for filling of the container directly through an open spout 122.

Figure 3:
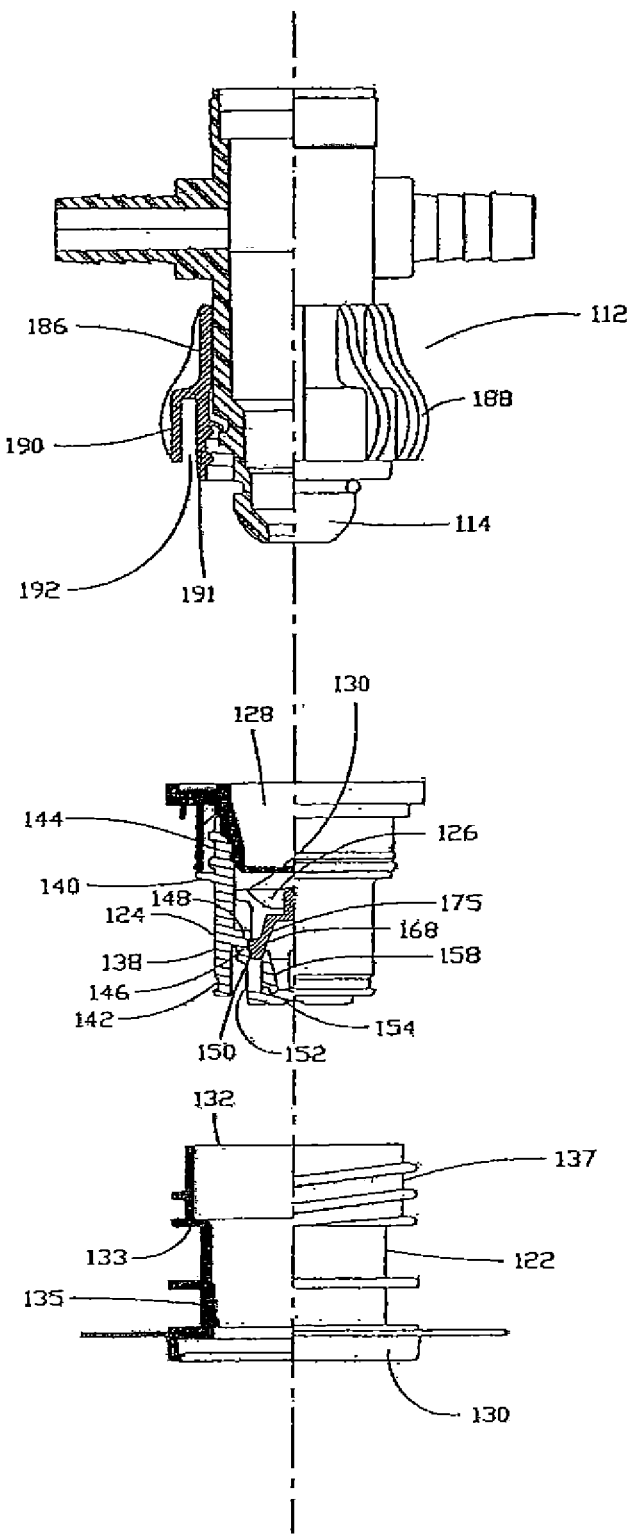
FIG. 3 illustrates a partial cross-sectional side view of a first embodiment of the fitment assembly of the present invention and a dispensing connector in a fill position.

FIG. 3 illustrates a partial cross-sectional side view of the double slider valve fitment 120 in a fill position. In this position the external valve body 124, internal valve body 126 and cap 128 are removed from spout 122 and the container is filled.

FIG. 4 illustrates a partial cross-sectional side view of the double slider valve fitment 120 in a full-cap position. This position is suitable for a filled container ready for delivery to the end-user. In this position, the stop ridge 140 and the positioning ring 142 of the external valve body 124 are engaged with the interior of the spout 122, so that the double slider valve fitment 120 is securely positioned within the spout 122. The cap 128 is secured to the fitment 120.

FIG. 5 illustrates a partial cross-sectional side view of the collar 112 and the double slider valve fitment 120 in a dispense position with the dispensing connector 114. In this position, the user removes the cap 128, as shown. The dispensing connector 114 is engaged with the double slider valve fitment 120.

Figure 9:
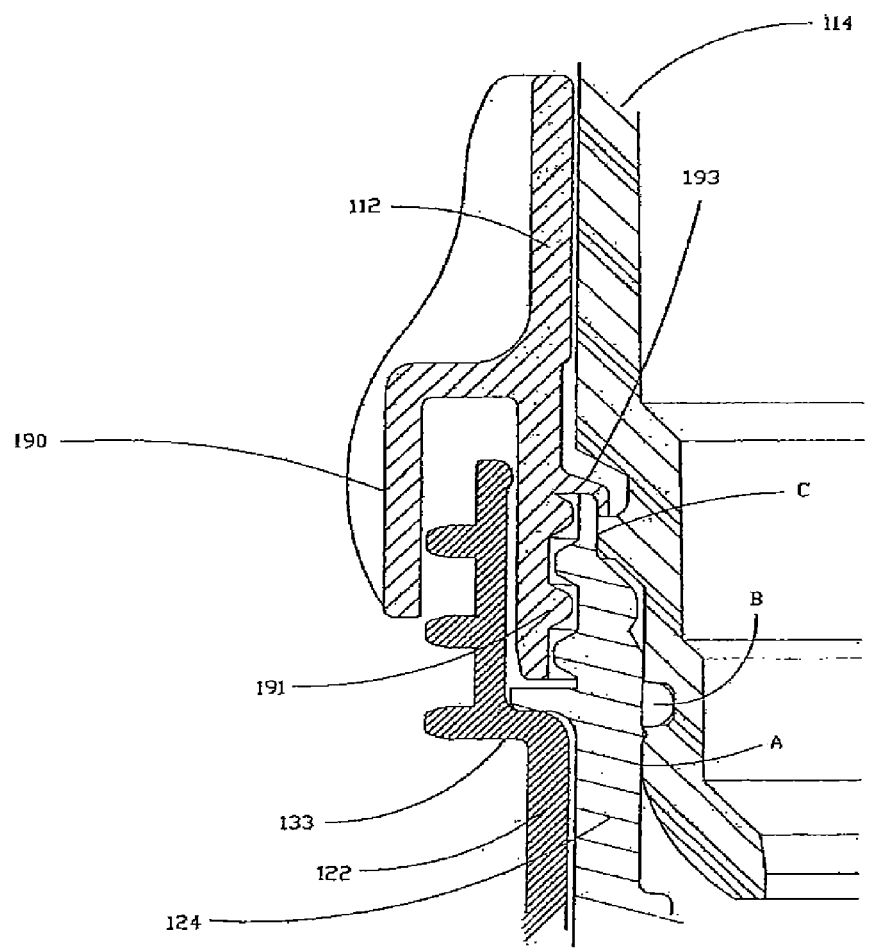
FIG. 9 illustrates an enlarged view of the sealing points of FIG. 5.
Figure 10:
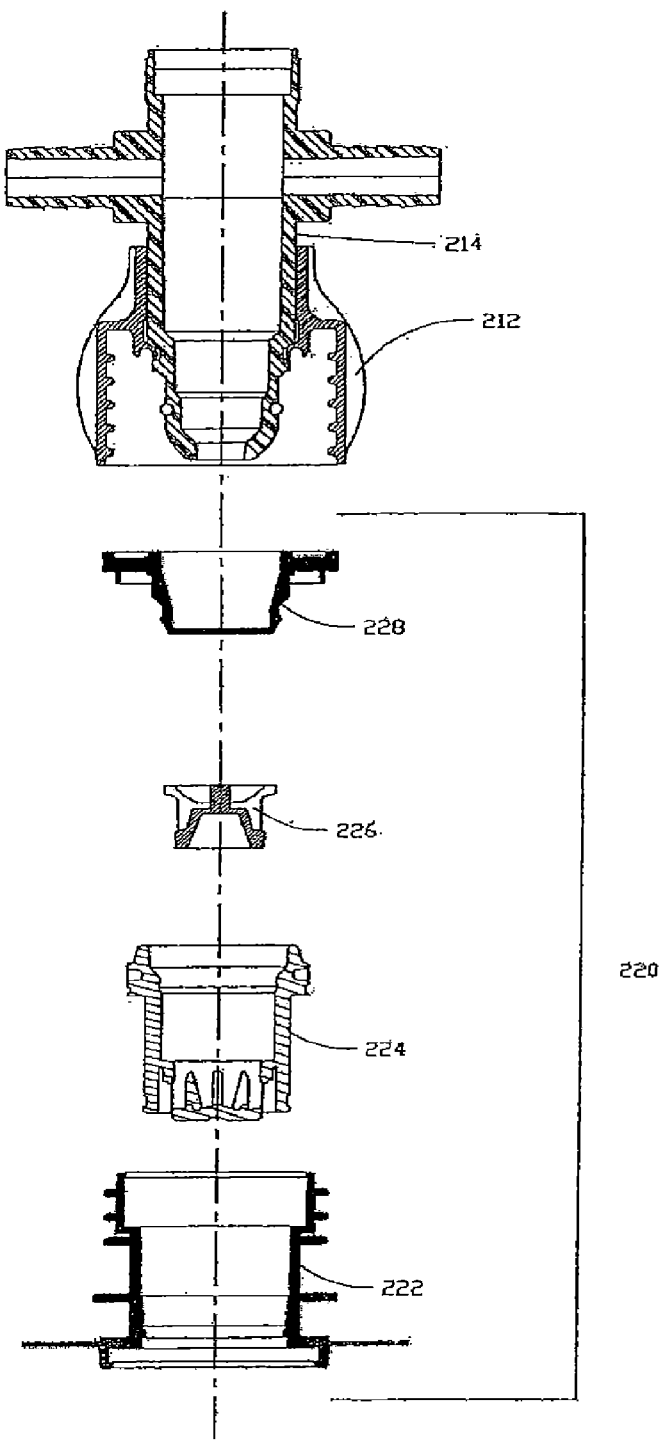
FIG. 10 illustrates an exploded cross-sectional side view of a second embodiment of the fitment assembly of the present invention with a dispensing connector.
Figure 11:
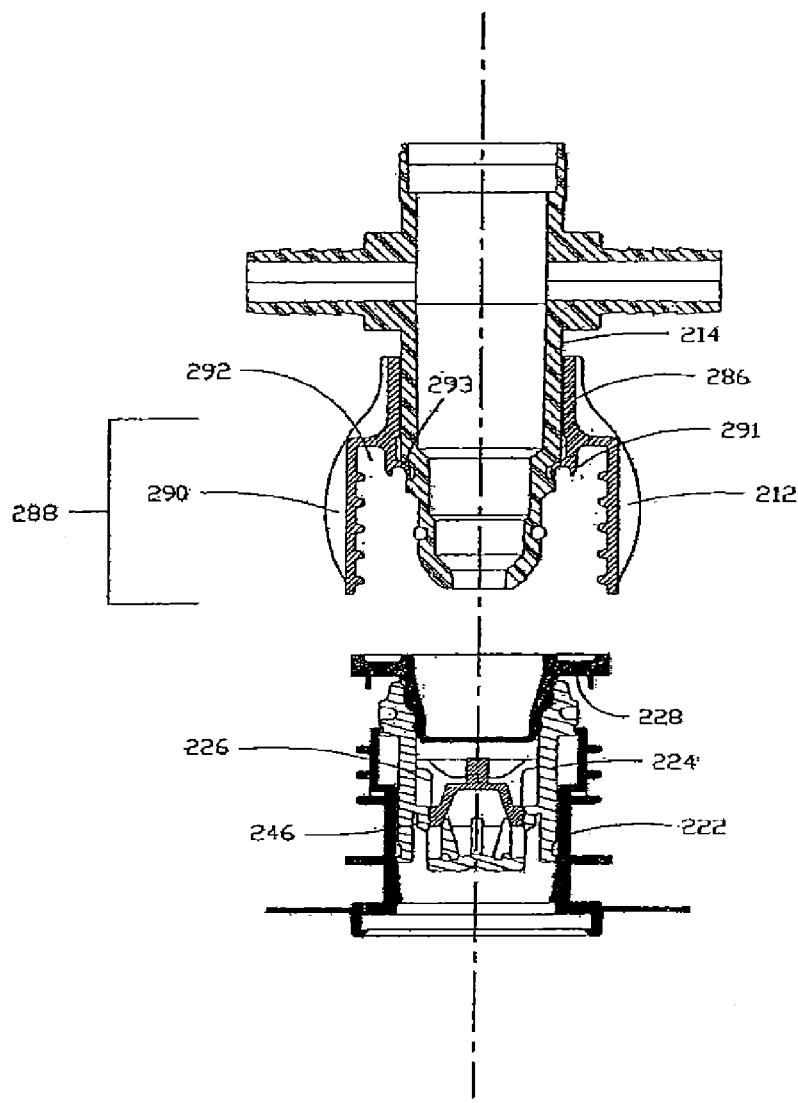
FIG. 11 illustrates a cross-sectional side view of a second embodiment of the fitment assembly of the present invention and a dispensing connector in a pre-cap position.
Figure 12:
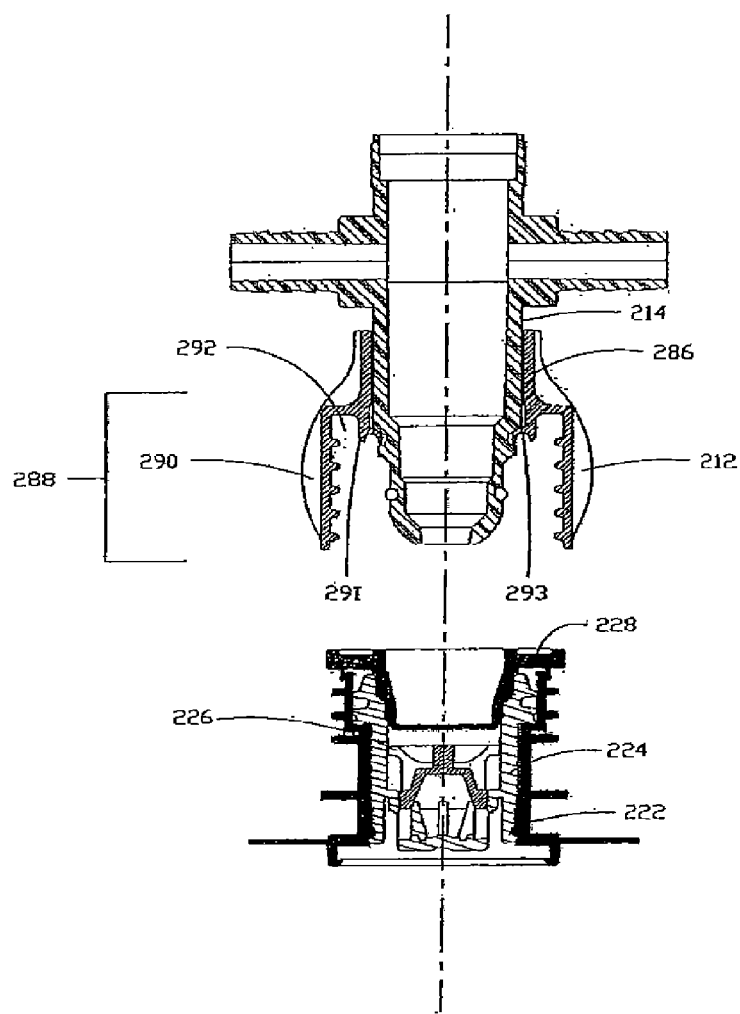
FIG. 12 illustrates a cross-sectional side view of a second embodiment of a fitment assembly of the present invention and a dispensing connector in a full-cap position.
Figure 13:
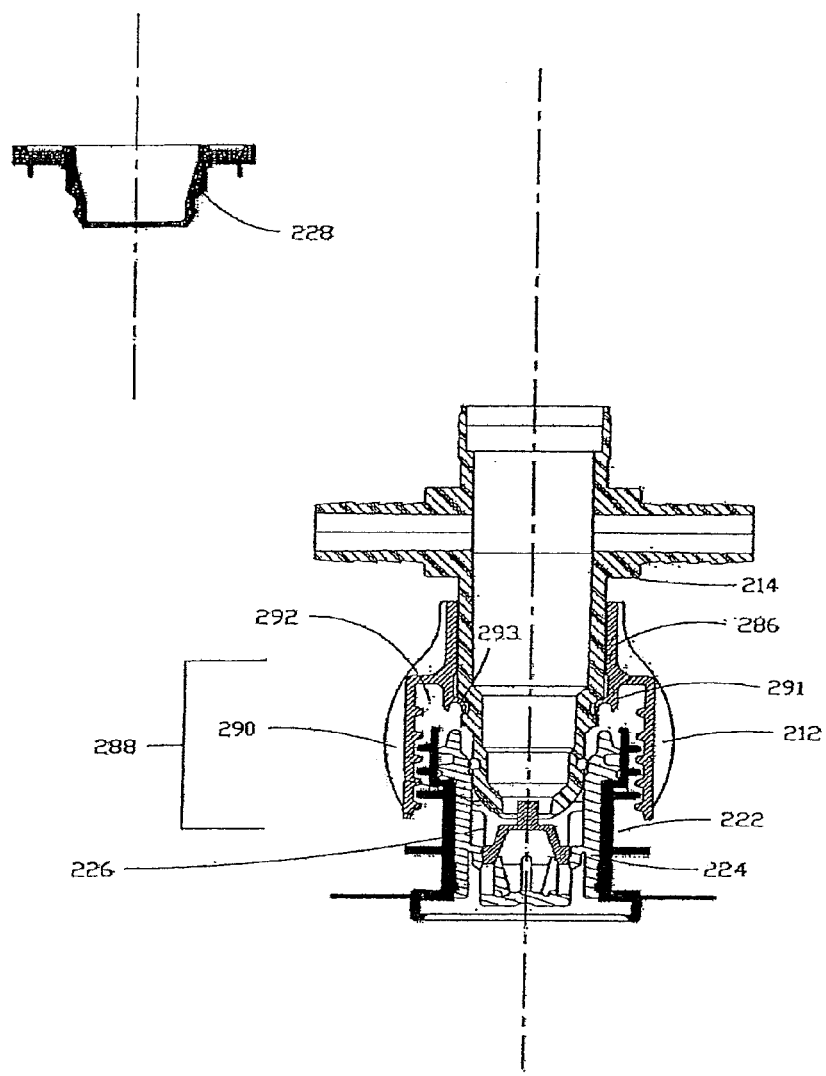
FIG. 13 illustrates a cross-sectional side view of a second embodiment of a fitment assembly of the present invention and a dispensing connector in a probe contact position.
Figure 14:
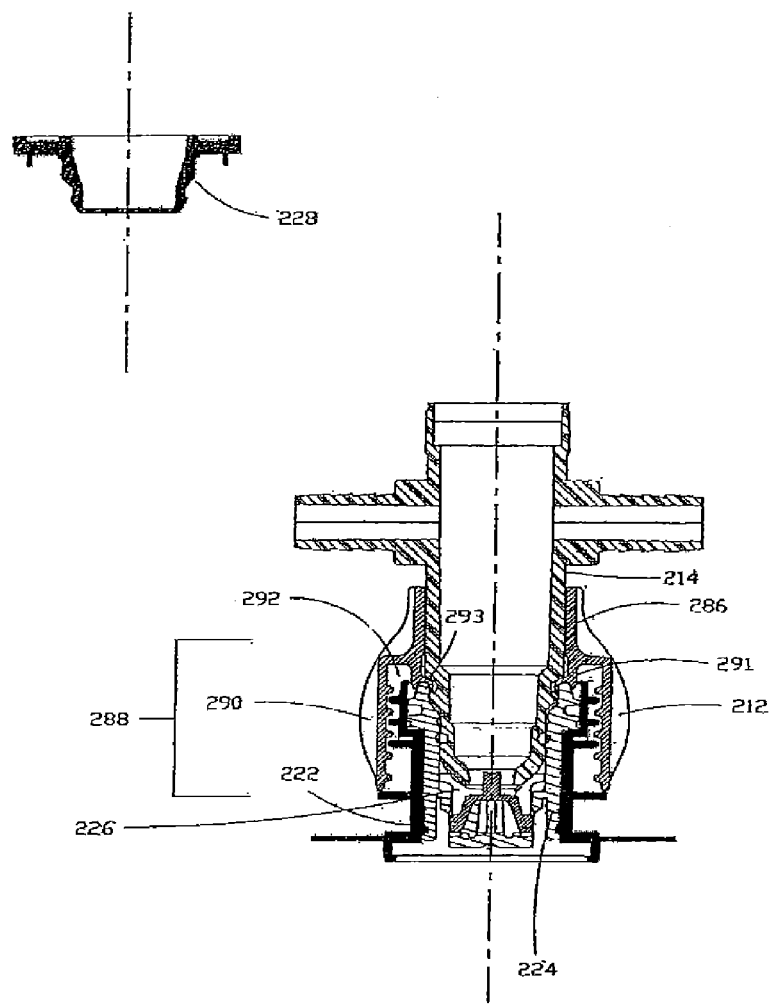
FIG. 14 illustrates a cross-sectional side view of a second embodiment of a fitment assembly of the present invention and a dispensing connector in a dispense position.
Figure 16:
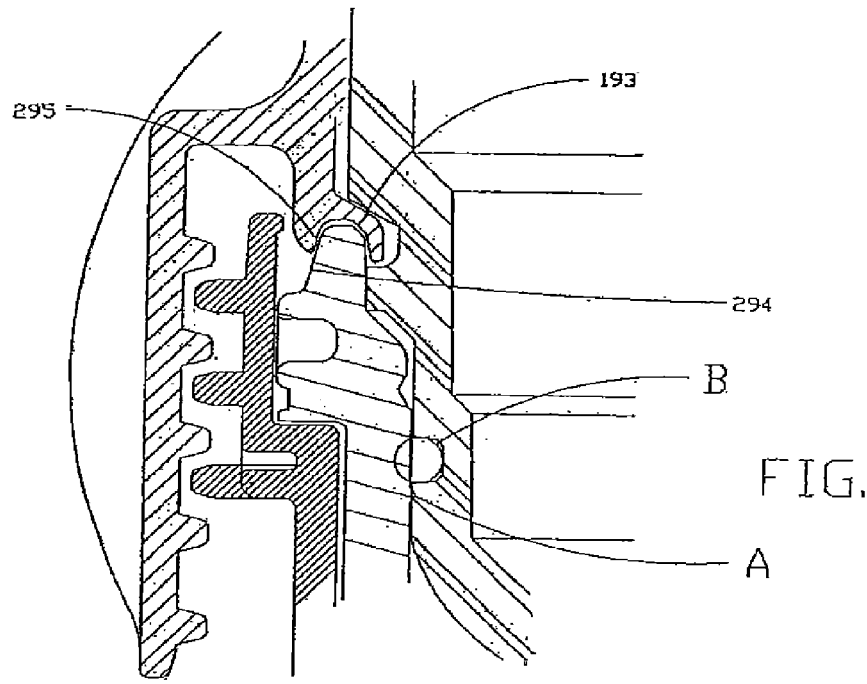
FIG. 16 illustrates an enlarged view of the sealing points of FIG. 15.
Figure 15:
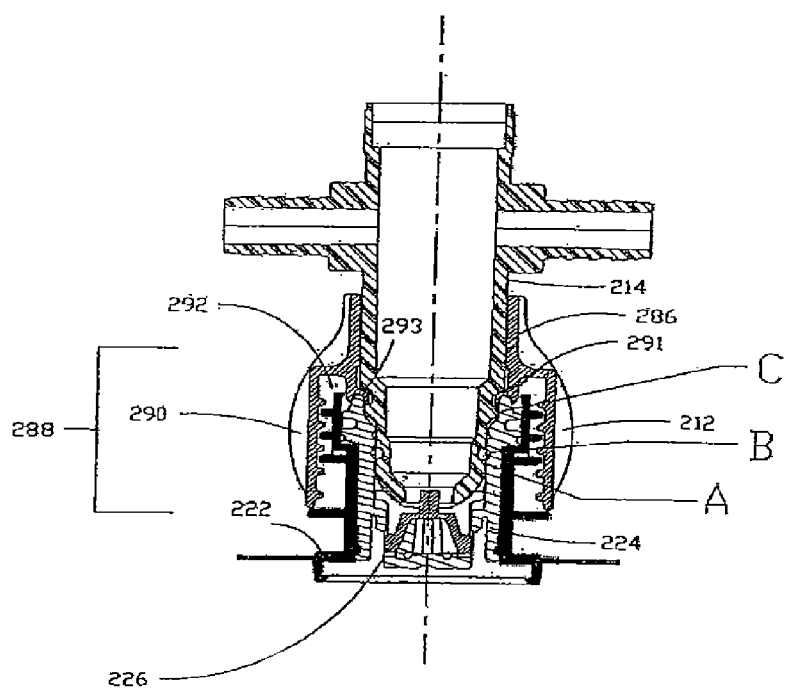
FIG. 15 illustrates a cross-sectional side view of a second embodiment of a fitment assembly of the present invention and a dispensing connector in a dispense position and shows the preferred points of sealing.

The dispensing connector 114 moves the valve to an open position. In the present invention, collar 112 engages with external valve body 124 to provide an additional point of sealing. With reference to FIGS. 5 and 9, as the collar 112 is threaded onto the external valve body 124, it pulls the dispensing connector 114 down into the external valve body 124 where the nose of the dispensing connector 114 come into contact with the internal valve body 126. The threading then moves the internal valve body 126 down into the dispensing position where a first seal A and second seal B associated with an O-ring on the dispensing connector 114 are made during this action. As the collar 112 starts to reach the end of its stroke, a compression flange 193 on the collar 112 comes into contact with the top of the external valve body 124. The compression flange 193 then goes into the inside of the external valve body 124 and as it moves down on the external valve body 124, thereby compresses the top of the external valve body 124 against the dispensing connector 114 to form a third seal C between the external valve body 124 and the dispensing connector 114. Seal C has a friction component and, accordingly, the tighter the collar 112 is turned, the tighter the third seal C becomes. While certain embodiments of the compression flange are shown, a compression flange refers to a flange that generally compresses a top edge or portion of the external valve body 124 to form a sealing point against the dispensing connector 114.

As the collar 112 is threadably engaged with the threaded portion 144 of the external valve body 124, the collar 112 and the dispensing connector 114 apply an inward force on the internal valve body 126 and the internal valve body 126 is moved axially within the external valve body 124 towards the valve seat 154. The top ring 170 of the internal valve body 126 rests adjacent the upper surface 148 of the ledge 146, preventing further axial movement of the internal valve body 126 towards the valve seat 154. It will be understood by a person skilled in the art that further axial movement of the internal valve body 126 may be prevented by either the top ring 170 abutting the ledge 146 or the position of the valve seat 154 adjacent the internal valve body 126 or by both. The base ring 168 rests against the valve seat 154 and the projections 158 on the valve seat 154 are biased inwardly by the internal walls 175 of the body 166 of the internal valve body 126. In this position, the ports 164 of the internal valve body 126 are in fluid communication with the apertures 153 located between the posts 152 on the external valve body 124, and fluid can flow from the container between the shell 138 and the valve seat 154 through the apertures 153 between the posts 152 and through the ports 164 on the internal valve body 126, into the dispensing connector 114.

Once the dispensing connector 114 is removed, the pressure on the internal valve body 126 is released and projections 158 will move to their normal position and push outwardly against the internal walls 175 of the body 166, which will push the internal valve body 126 up and away from the valve seat 154 towards the closed position.

Figure 6:
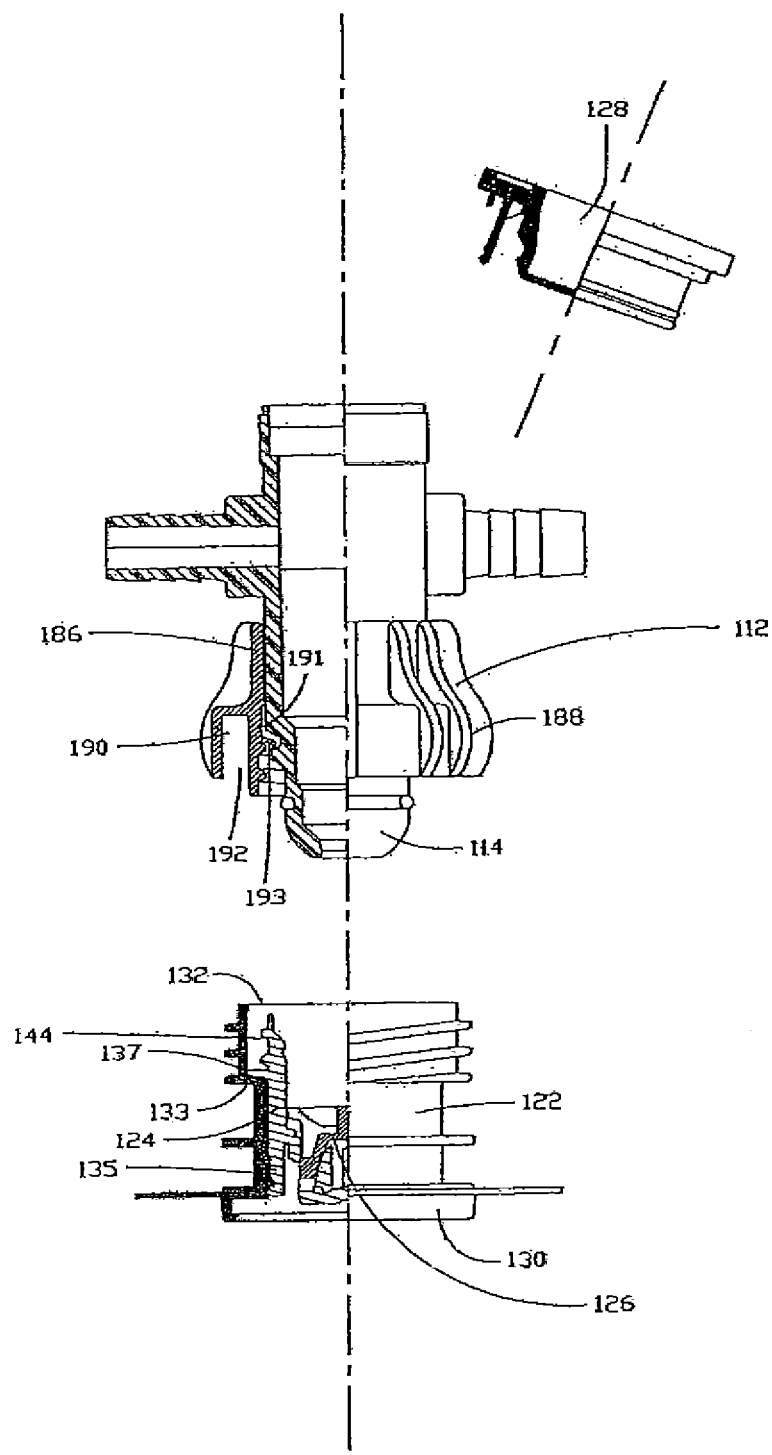
FIG. 6 illustrates a partial cross-sectional side view of a first embodiment of a fitment assembly of the present invention and a dispensing connector in a reseal and disconnect position.
Figure 7B:
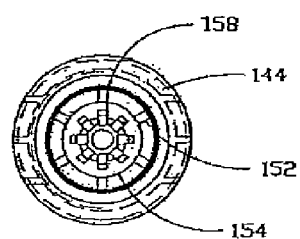
FIG. 7B illustrates a front elevational view of the external valve body of FIG. 7A.
Figure 7A:
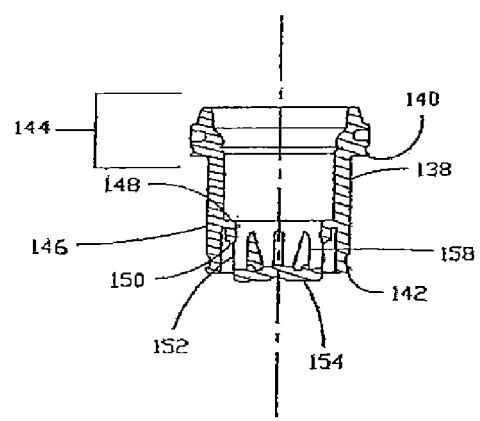
FIG. 7A illustrates a cross-sectional side view of an external valve body used in the fitment assembly of the present invention.
Figure 7C:
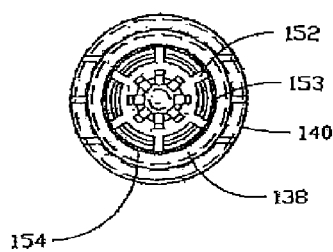
FIG. 7C illustrates a rear elevational view of the external valve body of FIG. 7A.

FIG. 6 illustrates a partial cross-sectional side view of the collar 112 and double slider fitment 120 of the present invention and a dispensing connector 114 in a reseal and disconnect position. As shown, the dispensing connector 114 is removed and the valve moves to a closed position of the fitment 120. The internal valve body 126 is received in the external valve body 124 with the top ring 170 spaced from the upper surface 148 of the ledge 146. The base ring 168 of the internal valve body 126 abuts against the upper ends of the posts 152 of the external valve body 124 and blocks any flow of fluid through the apertures 153 located between the posts 152. The closed position prevents any fluid from passing through the fitment 120 into the dispensing connector 114.

As mentioned above, a portion of the spout 122 may be received within the receiving space 192. In the embodiment shown, the receiving space 192 suitably has smooth walls, such that the spout 122 does not actively engage with any flanges on the exterior surface of the spout 122 and it can therefore receive spouts of various external configurations. While the collar 112 has been described with reference to a descending flange 190, suitably there is a plurality of discrete descending flanges positioned about the periphery of the collar body 186, although the flange 190 may extend about the periphery of the collar body 186. The internal surface of the collar body fitment end 188 is suitably threaded and is rotatably engageable with threaded portion 144 of external valve body 124.

A second embodiment of the invention will now be described with reference to FIGS. 10 through 16. In these figures, parts are numbered in the two-hundreds and like parts are numbered with like reference numerals in the second and third position.

Generally, the second embodiment works according to the same mechanism of the first embodiment described above, except as described below. In this embodiment, the fitment end 288 of collar body 286 is mateable with the fitment 220. The fitment end 288 comprises an external descending flange 290 and an internal descending flange 291 connected to the periphery of the collar body 286 to form a receiving space 292 which may receive a portion of spout 222. The internal surface of this descending flange 290 is threaded for threadably engaging the external surface of spout 222. In operation, as the dispensing connector 214 moves the valve to an open position, the collar 212 engages with external valve body 224 to provide an additional point of sealing. As the collar 212 is threaded onto the spout 222, it pulls the dispensing connector 214 down into the external valve body 224 where the nose of the dispensing connector 214 come into contact with the internal valve body 226. The threading then moves the internal valve body 226 down into the dispensing position where a first seal A and second seal B associated with an O-ring on dispensing connector 214 are made during this action. As the collar 212 starts to reach the end of its stroke, the compression flange 293 on the collar 212 comes into contact with the top of the external valve body 224. The compression flange 293 then goes into the inside of the top edge of external valve body 224 as the outside wedge angle 294 on the collar 212 starts to wedge against the lock 295 on the external valve body 224, thereby compressing the top of the external valve body 224 against the dispensing connector 214 to form a third seal C between the external valve body 224 and the dispensing connector 214. Accordingly, the tighter the collar 212 is turned, the tighter the third seal C becomes.

Compressions flanges, 193 and 293 furnish a further advantage to the fitment assembly of the present invention. As previously Mentioned, known fitments have a tendency for the collar and probe to become inadvertently disengaged. In the present invention compression flanges 193 and 293 suitably "locks" into a groove typical of probes common in the field, thereby reducing the likelihood of inadvertent collar and probe separation. As will be apparent with reference in particular to FIGS. 9 and 16 as the ledge of the probe pushes upward on compression flange 193 or 293, the compression flange is further secured within the groove thereby further securing the two components together.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description.

All publications, patents and patent application referred to herein are incorporated by reference in their entirety to the same extent as if each individual publication, patent or patent application was specifically and individually indicated to be incorporated by reference in its entirety.

Listing of Parts

In the figures, like parts are denoted by the same numerals in the second and third positions, which are indicated in the listing below.

Fitment assembly 110
Collar 112
Dispensing connector 114
Double slider valve fitment 120
Spout 122
External valve body 124
Internal valve body 126
Cap 128
Base portion 130
Spout opening 132
Stop ridge 133
Sealing rings 135
External surface of spout 137
External shell of external valve body 138
Stop ridge 140
Positioning ring 142
Threaded portion 144
Projection 146
Upper surface of projection 148
Lower edge of projection 150
Radially spaced posts 152
Apertures 153
Valve seat 154
Spaced projections 158
Ports 164
Generally cylindrical body 166
Base ring 168
Top ring 170
Post 174
Internal walls 175
Cover 176
Skirt 178
Outer retaining ring 180
Internal cylinder 182
Internal retaining ring 184
Outer descending skirt 185
Collar body 186
Collar body fitment end 188
External descending flange 190
Internal descending flange 191
Receiving space 192
Compression flange 193
Wedge angle 194
Lock 195

What is a claimed is:

1. A process for assembling a fitment on to a filled or unfilled container, comprising the steps as follows:
   (I) assembling a generally cylindrical internal slider valve into a generally cylindrical external valve body to form a valve body assembly into a primary seal position;
   (II) putting a cap on said external valve body of said valve body assembly;
   (III) assembling said assembly of said cap and said valve body assembly on to a generally cylindrical spout in a pre-cap position to form a fitment assembly; and
   (IV) affixing the assembly of Step (III) to said container wherein said fitment assembly comprises said fitment for attachment to said container for holding and dispensing a fluid, wherein said fitment has said spout attached thereto, said fitment further comprises said external valve body movable to a fixed position within said spout; and said internal valve body movable axially within said external valve body, said internal valve body movable between a closed position operable to prevent the flow of fluid through said fitment and an open position operable to allow the flow of fluid through said fitment, said internal valve body movable between closed and open positions by insertion of a dispensing connector into said external valve body adjacent said internal valve body, said internal valve body being biased toward the closed position; and a collar for attachment to said dispensing connector and for releasable coupling to said fitment, wherein when coupled to said fitment said collar compressively engages said external valve body to form a seal between said external valve body and said dispensing connector;

wherein said collar comprises a generally cylindrical collar body for engagement about said dispensing connector and a fitment end for coupling to said fitment;

wherein said collar comprises a compression flange connected to the collar body at said fitment end for engaging and compressing a top edge of said external valve body; and wherein the fitment end comprises an external descending flange and an internal descending flange connected to said base of said collar body, said external descending flange and said internal descending flange being concentric and spaced from each other.

2. A process for assembling a fitment on to a filled or an unfilled container, comprising the steps as follows:
   (I) assembling a generally cylindrical internal slider valve into a generally cylindrical external valve body to form a valve body assembly into a primary seal position;
   (II) putting a cap on said external valve body of said valve body assembly;
   (III) assembling said assembly of said cap and said valve body assembly on to a generally cylindrical spout in a full-cap position to form a fitment assembly; and
   (IV) affixing said assembly of Step (III) to the container
   wherein said fitment assembly comprises said fitment for attachment to said container for holding and dispensing a fluid, wherein said fitment has said spout attached thereto, said fitment further comprises said external valve body movable to a fixed position within said spout; and said internal valve body movable axially within said external valve body, said internal valve body movable between a closed position operable to prevent the flow of fluid through said fitment and an open position operable to allow the flow of fluid through said fitment, said internal valve body movable between closed and open positions by insertion of a dispensing connector into said external valve body adjacent said internal valve body, said internal valve body being biased toward the closed position; and a collar for attachment to said dispensing connector and for releasable coupling to said fitment, wherein when coupled to said fitment said collar compressively engages said external valve body to form a seal between said external valve body and said dispensing connector;
   wherein said collar comprises a generally cylindrical collar body for engagement about said dispensing connector and a fitment end for coupling to said fitment;
   wherein said collar comprises a compression flange connected to the collar body at said fitment end for engaging and compressing a top edge of said external valve body; and wherein the fitment end comprises an external descending flange and an internal descending flange connected to said base of said collar body, said external descending flange and said internal descending flange being concentric and spaced from each other.

3. A process for dispensing fluid from a container comprising:
   (A) assembling a fitment on to an unfilled container; wherein said assembling comprises the steps as follows:
      (I) assembling a generally cylindrical internal slider valve into a generically cylindrical external valve body to form a valve body assembly into a primary seal position;
      (II) putting a cap on said external valve body of said valve body assembly;
      (III) assembling said assembly of the cap and said valve body assembly on to a spout in a pre-cap position;
      (IV) affixing said assembly of Step (III) to said container;
   (B) removing the cap and said external valve body assembly off said container;
   (C) filling said container with a dispensing fluid;
   (D) re-assembling said cap and said external valve body assembly on to said spout in a full-cap position;
   (E) attaching a dispensing connector-collar assembly to said fitment; and
   (F) dispensing said dispensing fluid from said container;
   wherein said fitment assembly comprises said fitment for attachment to said container for holding and dispensing a fluid, wherein said fitment has said spout attached thereto, said fitment further comprises said external valve body movable to a fixed position within said spout; and said internal valve body movable axially within said external valve body, said internal valve body movable between a closed position operable to prevent the flow of fluid through said fitment and an open position operable to allow the flow of fluid through said fitment, said internal valve body movable between closed and open positions by insertion of a dispensing connector into said external valve body adjacent said internal valve body, said internal valve body being biased toward the closed position; and a collar for attachment to said dispensing connector and for releasable coupling to said fitment, wherein when coupled to said fitment said collar compressively engages said external valve body to form a seal between said external valve body and said dispensing connector;
   wherein said collar comprises a generally cylindrical collar body for engagement about said dispensing connector and a fitment end for coupling to said fitment;
   wherein said collar comprises a compression flange connected to the collar body at said fitment end for engaging and compressing a top edge of said external valve body; and wherein the fitment end comprises an external descending flange and an internal descending flange connected to said base of said collar body, said external descending flange and said internal descending flange being concentric and spaced from each other.

* * * * *